Dec. 5, 1944.　　　　V. J. HULTQUIST　　　　2,364,365
TRANSPORT TRAILER
Filed June 18, 1943　　　　5 Sheets-Sheet 1
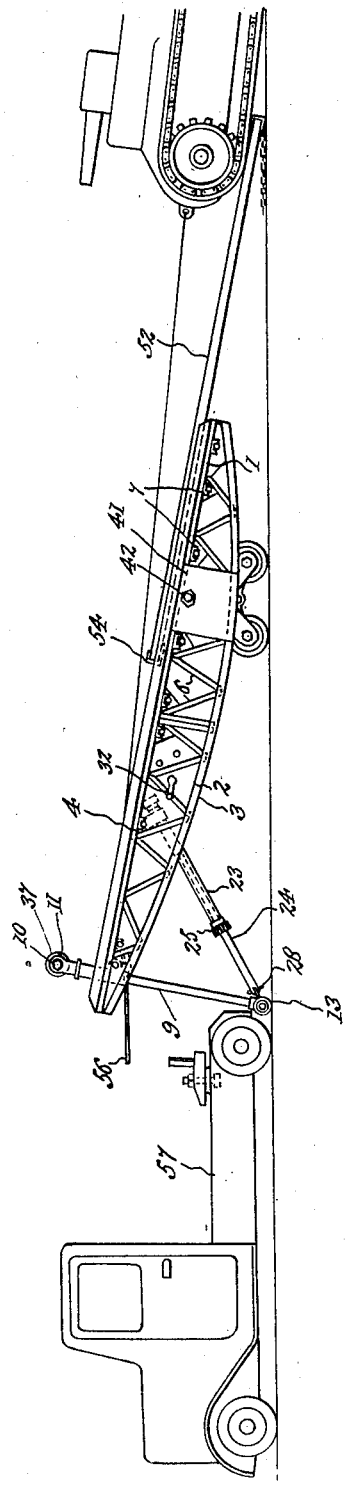
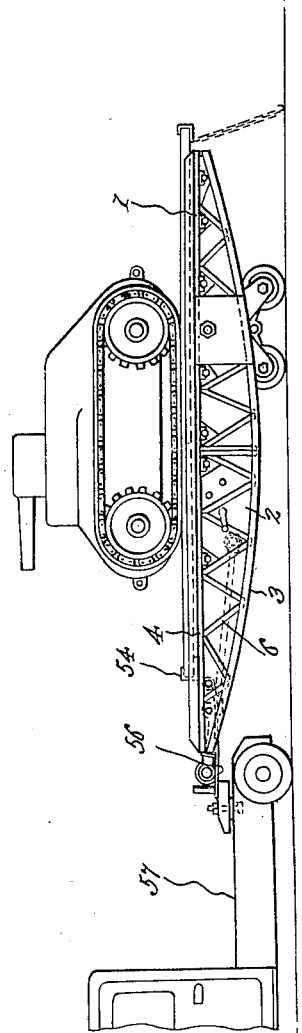
Inventor
Victor J. Hultquist
by
Attorney

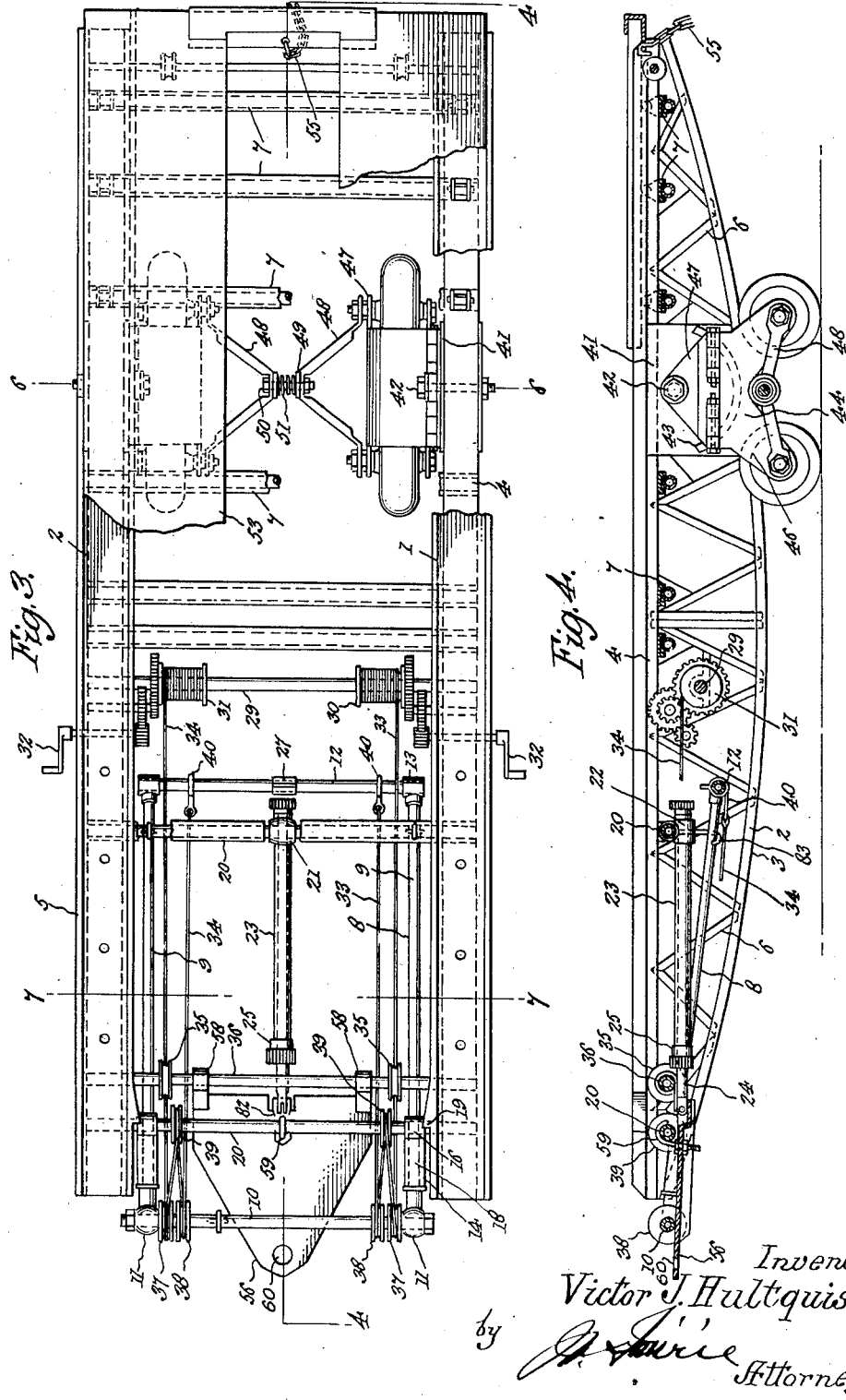

Dec. 5, 1944. V. J. HULTQUIST 2,364,365
TRANSPORT TRAILER
Filed June 18, 1943 5 Sheets-Sheet 3
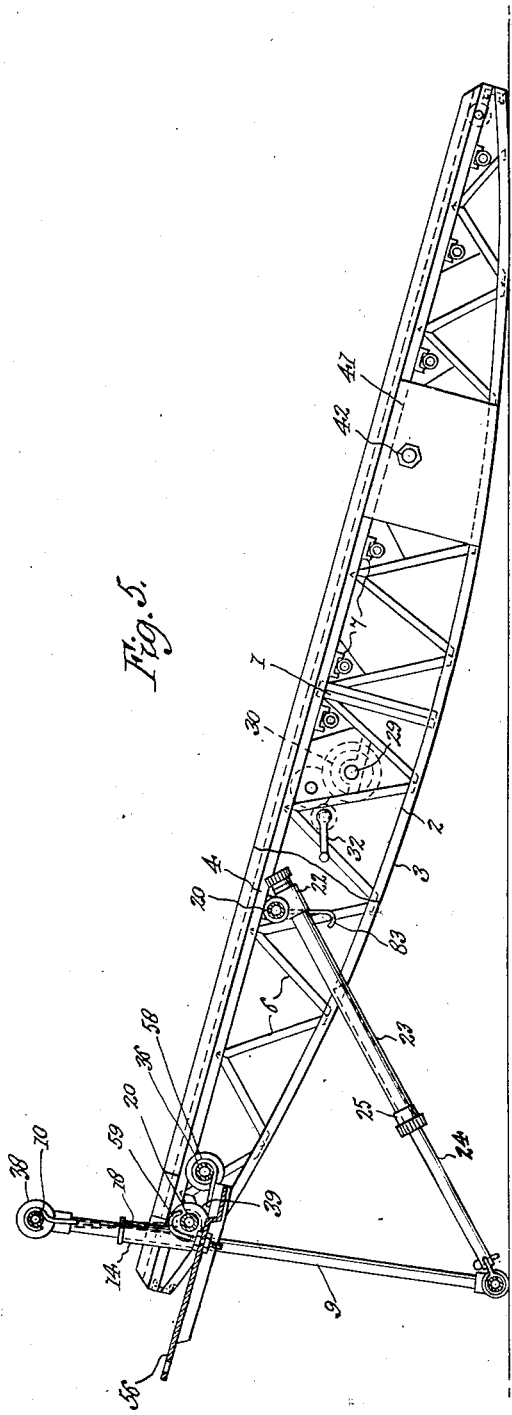
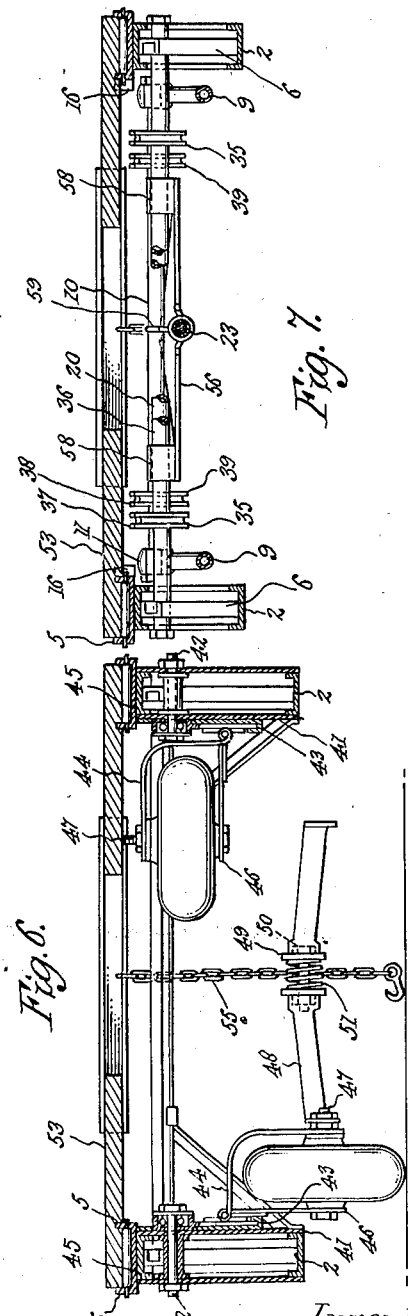
Inventor
Victor J. Hultquist
by
Attorney

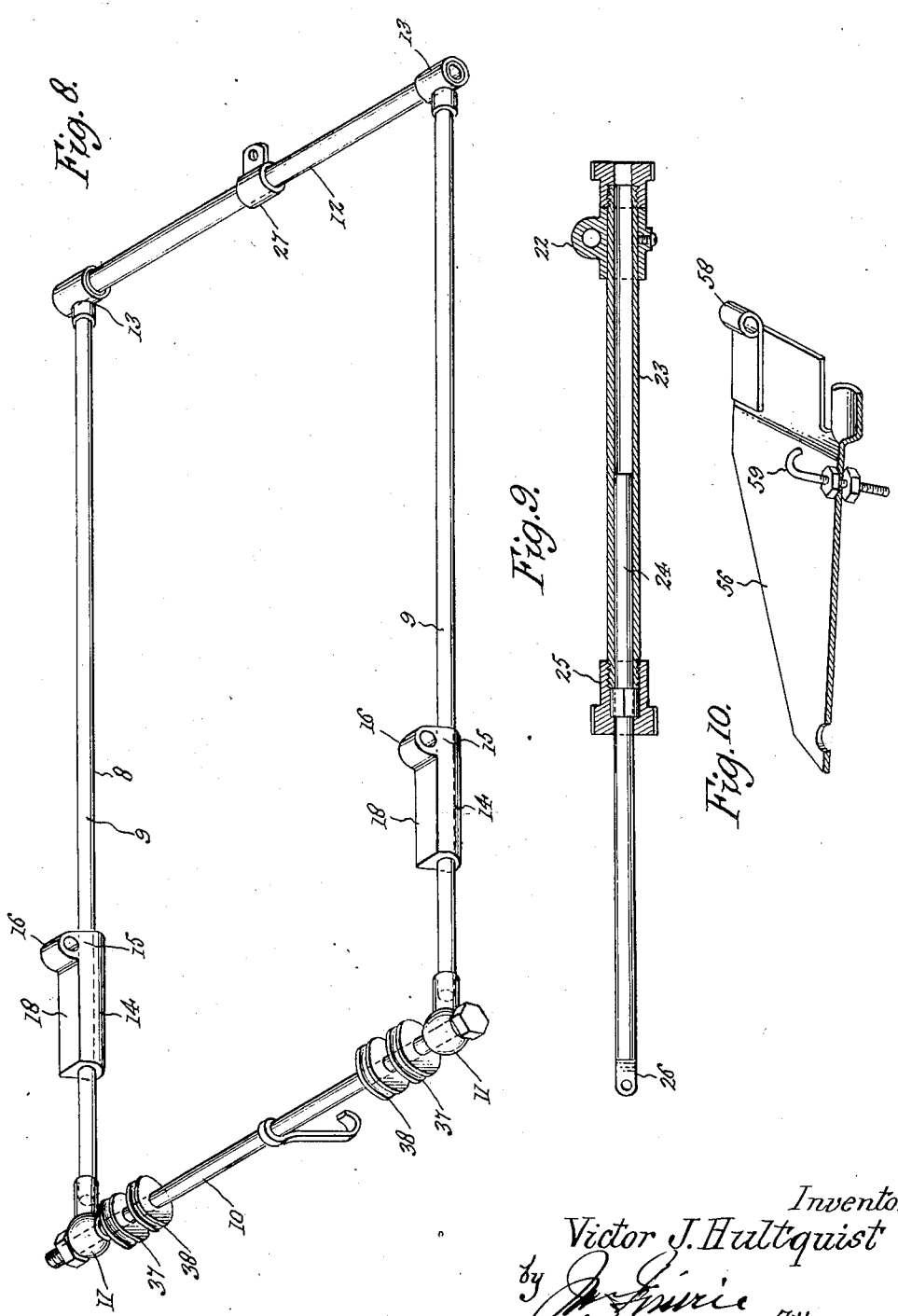

Dec. 5, 1944.   V. J. HULTQUIST   2,364,365
TRANSPORT TRAILER
Filed June 18, 1943   5 Sheets-Sheet 5
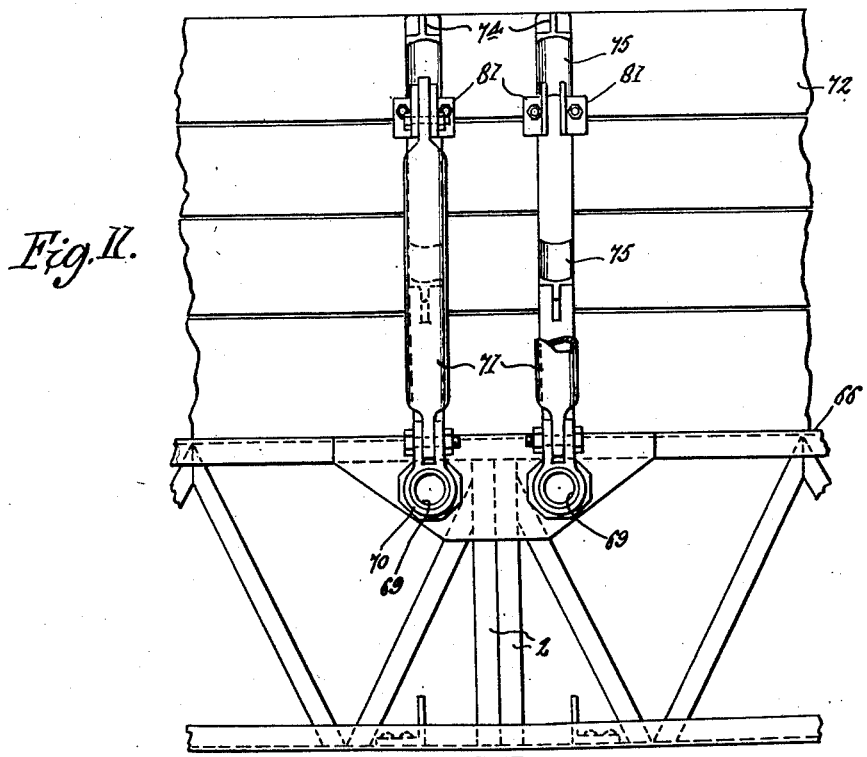
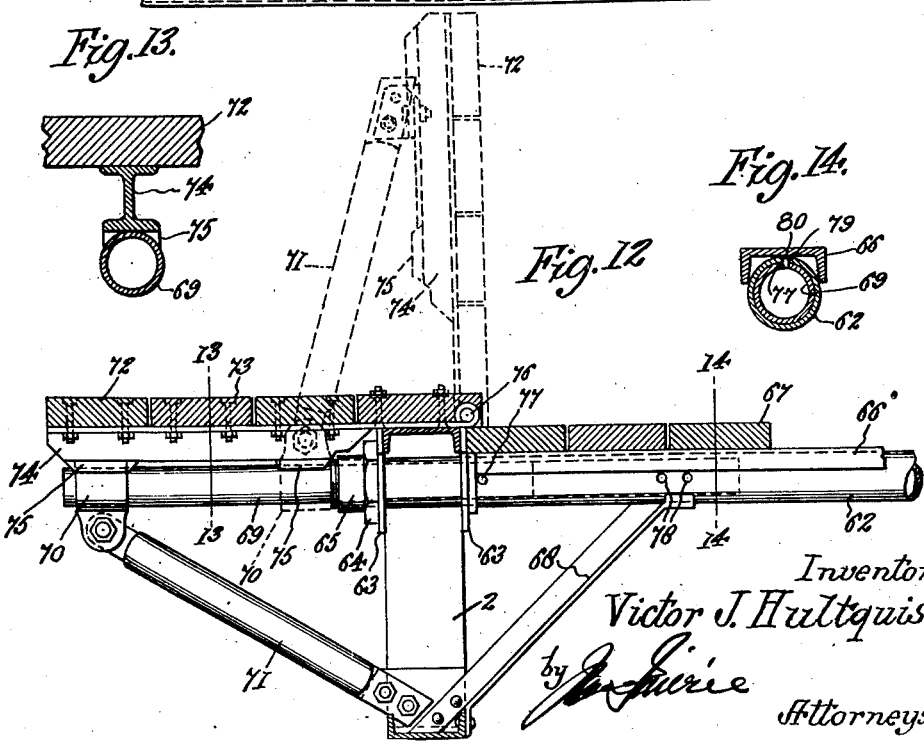
Inventor
Victor J. Hultquist
Attorneys Patented Dec. 5, 1944

2,364,365

UNITED STATES PATENT OFFICE 2,364,365

TRANSPORT TRAILER

Victor J. Hultquist, Alcoa, Tenn.

Application June 18, 1943, Serial No. 491,327

11 Claims. (Cl. 214—85)

This invention is directed to an improvement in transport trailers, comprehending a unit for the transport of any and all articles within its load capacity for any particular purpose.

It frequently becomes necessary to transport a relatively slow-moving vehicle, for instance, a tractor, to a new location at a speed beyond the speed capacity of the tractor; to transport disabled aeroplanes to a place of repair; to transport vehicles, as automobiles, from place to place when lacking a driver for each; to transport soldiers or workmen from place to place in a body; or to transport bulk merchandise or equipment from one locality to another with rapidity and convenience.

In particular instances of such transport, as for example in time of war conditions, the transportation problem is often seriously handicapped by the necessity of loading the trailer under difficult ground conditions, with a limited number of men for the loading, and hence the desired trailer unit must be relatively light in itself to avoid load increase, must be capable of being conveniently and swiftly loaded on practically any ground surface, and must be equipped for loading and handling by the minimum number of men.

The present invention, therefore, has for its principal object, the provision of a wheel-traveling transport trailer of light and strong construction, with included mechanism for convenient loading and handling relatively heavy bodies, as tractors, automobiles, or aeroplanes, under practically any ground conditions and with minimum man power, the included mechanism providing for the change of the trailer from a rigid loading condition to a condition of an easily movable ground-traveling vehicle, readily and simply responsive to connection with and movement by an auxiliary power vehicle.

A further object of the invention is the provision of a trailer of this type having a main frame with depending side walls preferably of skeleton form, which are curved on their lower edges from end to end to provide rocking support for the trailer in some uses, the frame being provided with ground wheels adjacent the rear end, with such wheels foldable relative to the frame to cause them, when required to be moved out of operative position, to permit the frame to be ground supported on the rocker side walls.

A further object is the provision of an elevating brace swingingly and slidably mounted at the forward end of the frame and operated through manual or other power-operated cables or the like to be moved to support the forward end of the frame at a height that will lower the rear end, either on the wheels or rocking side bars as a fulcrum, toward the ground surface for loading, the brace compelling and maintaining the forward end of the frame at a desired height from the ground, and when not required for use, being swung and moved to a position beneath the frame between the side bars.

A further object of the invention is the provision of an auxiliary platform formed for sliding interfitting cooperation, and serving as an extension of the frame when the latter is in loading position, particularly when the ground wheels serve as the tilting fulcrum to provide for more convenient loading, particularly of wheel-supported loads, and to simplify the positioning of the load on the trailer proper, the power-operated cables for controlling the brace being adapted for drawing the load onto the extended auxiliary platform and then drawing the platform and load into the trailer frame.

A further object is the provision of a platform, either fixed or slidable relative to the body, which is particularly adapted to transport objects requiring greater supporting width than the normal width of the trailer body, such, for example, as an aeroplane with a wide-spread landing gear, the platform including foldable side sections which may be extended in the plane of the trailer body proper to materially increase the carrying width of such body, the side sections being at will movable into vertical planes with respect to the body platform to provide side guards for any load on the body platform proper.

The invention in its preferred form will be later described in detail, with particular reference to the accompanying drawings, in which:

Figure 1 is a side elevation of the trailer in loading position, with one type of platform extended for loading purposes.

Figure 2 is a similar view showing the trailer loaded and ready for transport.

Figure 3 is a plan of the trailer, parts being broken out for convenience in showing certain details.

Figure 4 is a longitudinal section of the same on line 4—4 of Figure 3.

Figure 5 is a side elevation of the trailer shown in another ground relation for loading.

Figure 6 is a transverse section on the line 6—6 of Figure 3, one of the ground-wheel assemblies being shown moved to an inoperative position assumed in loading ground position shown in Figure 5.

Figure 7 is a transverse section on the line 7—7 of Figure 3, the cables being omitted.

Figure 8 is a perspective view of the elevating brace.

Figure 9 is a longitudinal section, partly in elevation, of the adjustable strut for the elevating brace.

Figure 10 is a broken perspective of the coupling plate for connecting the trailer to the draft vehicle.

Figure 11 is a broken side view showing the widened platform in position with the side sections turned up into wall-forming relation to the trailer platform proper.

Figure 12 is a broken transverse section showing the widened platform applied to the trailer, the side section being shown in platform-widening position in full lines, and in elevated position in dotted outline.

Figure 13 is a section on line 13—13 of Figure 12.

Figure 14 is a section on line 14—14 of Figure 12.

The improved carrier trailer includes a main frame 1, hereinafter referred to as the ground frame, constructed primarily for strength with comparatively light weight. The ground frame comprises two side members, each having side bars 2, preferably, but not necessarily, of skeleton form, having ground engaging arcuate rails 3, hereinafter termed rocker rails, and upper straight guide rails 4, preferably, at least in the preferred form, having upstanding edge flanges 5, to thereby form channeled guides, as more clearly shown in Figure 3. The rocker rail and guide rail of each ground frame are, in the preferred form, connected by bracing struts 6, positioned to constitute a rigid relatively light load resisting frame structure.

The ground frame per se includes two such side members, spaced apart for desired width, and connected for rigidity and strength by transverse, preferably hollow, spacing bars 7, arranged at appropriate points lengthwise the frame and secured to the respective frame members in any conventional or desired manner.

As will later appear in the description of the operation of the trailer, it is necessary to tilt the ground frame 1 to incline the guide-rail surface downwardly from front to rear for loading purposes, and to return the ground frame to substantially level position for transportation.

To provide for this ground frame movement in a simple and convenient manner, the forward end of the ground frame is provided with an elevating and lowering element 8, hereinafter termed the elevating brace, and more particularly shown in Figure 8. This brace comprises side rods 9, an upper end rod 10 rotatably mounted in bearing caps 11, carried by the side rods 9, and a lower end rod 12, rigid in couplings 13 with the side rods. The elevating brace thus constitutes a rectangular frame fixed in its dimensions, and having a width to be freely received between the side members of the ground frame and of a length as will permit proper operation of such ground frame, as will later appear.

The elevating brace is mounted for sliding and swinging movement relative to the ground frame through guide brackets 14, which have elongated hollow guiding sections 15, in which the side rods 9 of the brace 8 are slidably and accurately guided, and are also provided with relatively shorter hollow transverse guiding sections 16, rotatably supported on a transverse bar or rod 20, mounted in the side bars 2 of the ground frame 1. The transverse guiding sections 16 are arranged at the lower ends of the sections 15, and the rear faces of the latter above the sections 16 are flattened or squared at 18 to abut stops 19 carried by the guide rails 4 to limit the operative movement of the elevating brace to a position at substantially right angles to the surface of the ground frame.

The rod 20 is arranged transverse the ground frame 1, and secured in the side members 2, this rod rotatably supporting a bracket 21, having an offset hollow guide section 22, fixedly carrying a sleeve member 23 of an adjustable strut for fixing the elevating brace against movement in one direction. A preferably hollow rod 24 is slidably mounted in the sleeve 23 and of greater length than such sleeve; a clamping nut 25 of conventional form carried by the sleeve 23 serves to fix the rod 24 in any telescoped relation. The end of rod 24 is formed, preferably by a bifurcated terminal 26, to cooperate with a lip 27 extending from the lower end rod 12 of the elevating brace 8. The cooperating terminal 26 and lip 27 are formed with openings to align and receive a holding pin 28 to removably fix the adjustable strut and the elevating brace 8, and if the nut 25 has been operated to fix the rod 24 in the sleeve 23, it will be apparent that the lower end of the elevating brace 8 is substantially held against rearward movement, or in other words, snugly against stops 19.

In rear of rod 20, a drum shaft 29 is supported in the side members 2 of and transverse the ground frame, and drums 30 and 31 are fixed on and respectively adjacent the ends of the shaft 29. Means, such as cranks 32, with appropriate speed gearing, are provided for operating the shaft 29 and drums 30, 31, thereon, a conventional pawl and ratchet (not shown) being used to hold the cranks and thereby the drums in any fixed position. The cranks represent any desired means for operating the drums, it being contemplated that if desired engine-driven means may be employed.

Cables 33 and 34 are wound on the respective drums, and each leads from its drum to and beneath an idler 35 on a transverse frame shaft 36, over an idler 37, one of a pair of idlers 37, 38, mounted on the upper end rod 10 of the elevating brace 8, then down and around an idler 39 on rod 20, then up and over the remaining idler 38 of the pair, and then down to the lower end bar 12 of the elevating brace. The terminal of each cable has a hook 40 or other connector to permit the cable to be removably connected to the lower end bar 12 of the elevating brace for a purpose to be later explained.

Of course, the ground frame when being transported is wheel borne, but, as will later appear, it may be necessary to load the trailer under conditions requiring it to be supported on the rocker rails 3, under which circumstances the wheels must be moved out of operative positions.

The wheels, which are preferably provided in pairs on the inner side of each side bar 2 of the ground frame, are mounted for folding out of operative position at will, and yet arranged for independent accommodation to ground irregularities. The wheels are mounted much closer to the rear end of the ground frame than to the front or forward end, and each mounting includes a plate 41 secured to the inner side of each side bar 2 and carrying a pivot pin 42. The lower end of the plate is formed to provide an inwardly extending U-shaped guide 43, curved lengthwise the side bar in a plane concentric with the pivot pin 42. A cooperating pair of wheels is rotatably supported in spaced relation in a hanger 44, the upper end of which above the wheels is bent laterally and pivotally or swingingly connected to a plate 45, mounted on the pivot pin 42 and shaped at its lower edge to move freely in the U-shaped guide 43.

The axles of the wheels of each pair are connected by links 46 to a universal connector 47 to permit play of the wheels. The wheel axles of each pair are provided at their inner ends with brace straps 48 which converge toward the longitudinal center of the ground frame and terminate in spaced heads 49, connected by a bolt 50, capable of convenient removal, with the heads resiliently held in spaced relation by a spring 51 encircling the bolt.

By reason of the mounting described, the wheels will be held in ground-frame supporting relation and yet be capable of limited independent play to accommodate irregularities of the ground surface. When the wheels are to be folded out of ground-engaging positions, as for example under conditions to be later described, the bolt 50 and straps 48 are removed, and each pair of wheels folded inwardly on the hinged connection with plate 45, and temporarily held by any desired fastenings above the rocker rails 3.

The ground frame 1 may have a more or less permanent floor surface when the trailer is used primarily for transporting articles loaded easily and by hand, such as comparatively small packages, or troops, or animals, and such floor is designed, if necessary, to be particularly constructed for receiving the particular load, and may be covered for protection, if necessary. As this body arrangement is conventional in vehicles of many types, any illustration of such is unnecessary as any one of many well known forms or construction may be employed.

As the present trailer is, however, more particularly designed for rapid transportation of heavy generally wheeled vehicles, which by reason of their usual slow rate of travel under their own power or their being disabled, special means are necessary for loading such vehicles or the like onto the tractor.

Such special means includes an independent platform structure 52, designed when in loading position to form an extension of the ground frame, and to rest, with its load, entirely on the ground frame when in transporting position. This platform structure is of more or less skeleton form, including longitudinally-ranging spaced connected slats or strips 53 of wood or light metal, connected in any conventional way to provide a rigid structure, and having a length approaching the overall length of the ground frame 1. The platform may be of any desired width so long as it is capable of being supported on or guided in the channel guides 5. The forward end of the platform is provided with eye elements 54, and each end of the platform has flexible connectors 55 for load-restraining purposes.

A coupling plate 56 for connecting the trailer to a draft vehicle, indicated at 57, is preferably of triangular form in plan, with its base edge formed wth eyes 58 to swingingly engage shaft 36, the plate having a hook 59 which when the plate is in operative position may be engaged with the rod 17 to hold the coupling plate in the proper coupling plane. The forward end of the plate 57 has an opening 60 to engage over a pin 61 on the draft vehicle 57.

When desired or necessary to transport loads having a base wider than the trailer proper, such for example, as an aeroplane having a ground-wheel base wider than the trailer, the trailer is provided with a platform structure to accommodate and properly support such widened-base load, and such provision may, if desired, be a permanent trailer detail or separable from the trailer at will.

The improved widened-platform structure is shown in Figures 11 to 14 inclusive, and primarily includes side sections substantially coextensive with the length of the trailer, which sections may be moved and supported in the substantial plane of the trailer platform proper to increase the width of such platform, or such side sections may be swung up to form protecting side walls for the platform proper.

Specifically, the widened platform structure includes tubular beams 62 arranged transverse the side bars 2 of the trailer and extending a short distance beyond each side bar. The beams 62 are secured to the side bars by inner and outer gusset plates 63 and outer nuts 64 threaded on the beams, the end of the beams beyond the nuts being reinforced by collars 65 threaded thereon. The beams 62 carry channel bars 66 to provide a surface to which the boards 67 of the platform proper of the trailer may be supported. Braces 68 extend from the lower rail of the side bars 2 to the beams.

Extension beams 69 are arranged for telescopic movement in the open ends of the beams 62, and are each terminally provided with brackets 70, rotatably supported on but held against endwise movement relative to the extension beams 69. Braces 71 preferably tubular are removably secured at one end to the lower rails of the sides 2, and at the opposite end formed for interfitting with and for being removably secured to spaced ears forming part of the brackets 70.

Of course, as the lower rails of the trailer sides 2 are curved, the braces 71 will vary in length to hold the extension beams 69, which are of the same length in each position in a horizontal plane. The series of extension beams 69 on each side of the trailer support platform extensions, preferably in the form of planks 72, are secured as by bolts 73 to I-beams 74, which rest on the respective extension beams 69, and at appropriate points are formed with depending skirts 75 to partly embrace the extension beam.

The I-beams are hingedly connected at 76 to the inner gusset plate 63, so that the I-beams and platform section carried thereby may be moved as a unit. The beams 62 are provided with holes 77, 78, with which a hole 79 in each extension beam 69 may register in the respective positions of such extension, with a pin 80 engaging the registering holes to fix the extension beams in the desired position.

With the extension beams 69 extended and fixed by the pins 80, the braces 71 are fixed in position, and the platform sections, of which there is preferably one for each side of the trailer body, are turned down until the I-beams 74 rest on and interfit with the extension beams. The normal width of the platform of the trailer proper is thus decreased in width by the width of the platform extensions 72. Of course, there is no particular limit intended for the platform extensions 72, as they may be of any desired width for a particular or contemplated service or for a general service of the trailer.

When the platform extensions are not in use to increase the width of the trailer platform proper, such platform extensions are intended to be turned up on the hinge connections 76, whereupon the pins 80 being removed from holes 77 and 79, the extension beams are inwardly telescoped in beams 62 until secured in inward position by engaging pins 80 in holes 78 and 79. The brackets 70 are then turned on the extension beams until the braces 71, which have of course been disconnected from the rails of side 2 before adjusting the extension beams, are uppermost. The lower surfaces of the platform extensions are provided with auxiliary brackets 81 to cooperate with and provide for securing the ends of the braces 71 to thus secure the platform extensions in positions to provide protective side walls for the platform of the trailer proper. This position of the parts is shown in full lines in Figure 11, and in dotted lines in Figure 12.

In the operation of the transport trailer, particularly when constructed as shown in Figures 1 and 2, the trailer at the place where it is desired to load the same is, if the ground wheels are in ground-engaging position as shown in Figure 1, elevated at the forward end by elevating the elevating brace 8 by drawing upon the cables 33 and 34 through operation of the drums 30 and 31, the cables being hooked to the lower bar 12 of the elevating brace 8. The brace is in the upright position, shown in Figure 1, prior to the elevating movement of the forward end of the trailer and the elements 23 and 24 are adjusted and engaged with the clip 27 of the elevating brace to hold the same in this position. As the cables 33 and 34 are drawn upon by actuation of the drum shaft, the elevating brace is elevated with respect to the ground, that is, the forward end of the trailer is elevated, as shown in Figure 1. The auxiliary platform 52 is then moved longitudinally of the main trailer platform until the end of the auxiliary platform engages the ground. The load may then be moved up onto the auxiliary platform, though if the load is difficult to move, the hooks 40 of the cables 33 and 34 are disconnected from the bar 12 of the elevating brace and the hook ends of the cables carried rearwardly to engage any appropriate connector on the load. On operating the drums, the load is drawn onto the auxiliary platform, and after being fixed against movement thereon in any desired manner, the hooks 40 of the cables are connected to the eyes 54 of the auxiliary platform, and the auxiliary platform with the load thereon is drawn onto the main platform of the trailer. The auxiliary platform may be secured in any desired position on the main platform of the trailer by pins passing through holes in the auxiliary platform and the upper rails of the sides of the trailer, as shown in Figure 3. When the load is in position on the trailer, the brace elements 23 and 24 are disconnected by removing the pin 28 and the free end of this brace supported in a channel 82 in the coupling plate 56, as shown in Figure 3. The forward end of the trailer is then permitted to resume a level position, and the elevating brace is turned on to pivotal supports 16 and moved rearwardly between the sides of the trailer and held in inoperative position by a hook 83, depending from a convenient part of the trailer body. The coupling plate 56 is then connected with a draft pin on the draft vehicle 57 and the trailer and load are ready for movement.

It may be that the auxiliary platform 52 is dispensed with, under which circumstances, the ground wheels are turned up in a manner described and as indicated more particularly in Figure 6 at the right hand side, and the previous procedure duplicated to elevate the forward end of the trailer, such trailer during this elevation rocking on the rocker rails 3 forming the lower margins of the sides 2 of the trailer body. This operation and the relative positions of the parts is illustrated more particularly in Figure 5. The load is drawn directly onto the platform of the trailer and secured thereon in any appropriate manner against casual movement, and the trailer body lowered on the rocker rails to a position to permit the wheels to be again turned to ground-engaging position when the trailer and load are connected to the vehicle 57 for movement.

It frequently happens that a trailer of this character is called upon to handle a load which is wider than the normal width of the trailer body. Thus, for example, in removing a disabled aeroplane, the ground wheel base of which is wider than that of the tractor body, the tractor body as described will not properly support such aeroplane. For this purpose, the trailer body is provided, as illustrated particularly in Figures 11 to 14, with means which will readily provide an extension platform to accommodate the increased width of the load. The details of this platform have been described, and when the extension platform 72 is in the position illustrated in Figure 12, the normal width of the tractor platform is increased to accommodate the desired width of load to be carried. When the extension platform is not required for use, the extension sections may be turned up to form protective sides and guards for the normal platform of the trailer body, as shown in full lines in Figure 11, and in dotted lines in Figure 12.

The extension platform may form a permanent part of the trailer body if desired or may obviously be removed therefrom to form an attachment for the trailer to be used when desired.

The transport trailer as a whole provides for the rapid transportation of loads of any and all character, which are disabled or incapable of rapid travel in themselves, and in addition to such primary use, may serve as temporary bridges over streams or foot bridges over otherwise impassable ground, and many other obvious and desirable purposes.

What is claimed as new is:

1. A transport trailer including a ground frame, a shaft carried by said frame, an elevating brace slidably and swingingly supported by said shaft, cable drums carried by said frame, means for operating said drums, and cables leading from said drums and removably connected to said elevating brace for adjusting the elevating brace relative to said frame for longitudinal tilting of said frame relative to the ground surface, and a load-receiving platform mounted for movement on the ground frame, said cables when disconnected from the elevating frame being adapted for connection to the platform for operating the same relative to the ground frame.

2. A transport trailer including a ground frame having ground engaging rocker rails, ground engaging wheels carried by the frame, said wheels supporting the frame at a height to avoid ground contact of the rocker rails, said wheels being foldable relative to the frame to a position to permit the rocker rails to function as ground engaging elements, and means for elevating one end of said frame relative to the ground surface, said elevating means being operatively effective under either ground wheel or rocker rail support of the frame.

3. A construction as defined in claim 1, wherein the cables for operating the elevating brace when disconnected from the elevating brace being also usable for connection to the load to serve as load-drawing members in loading the trailer.

4. A transport trailer, including a ground frame, having arcuate ground-engaging rails, ground wheels carried by such rails and movable to a position to support the frame above the ground surface or to a position to permit the rails to serve as ground-engaging supports, and manually-operable means to selectively tilt the frame relative to the ground surface regardless of the frame ground support on the wheels or on the rails.

5. A construction as defined in claim 4, wherein the ground wheels are mounted rearwardly of the maximum vertical depth of the rails.

6. A construction as defined in claim 4, wherein a load receiving platform is movable on the frame to a position between the ends of the frame or to a position partly in rear of the rear end of the frame.

7. A construction as defined in claim 4, wherein the ground wheels are mounted rearwardly of the maximum vertical depth of the rails said platform having movable extensions to serve as upstanding side walls for the platform or side extensions for and in the plane of the platform.

8. A construction as defined in claim 4, wherein the ground wheels are mounted rearwardly of the maximum vertical depth of the rails said platform having movable extensions to serve as upstanding side walls for the platform or side extensions for and in the plane of the platform and wherein the manually operable means is in part usable as a means for moving the platform relative to the frame.

9. A construction as defined in claim 4, wherein said manually-operable means includes a skeleton frame elevating brace slidably and swingingly connected at the forward end of the frame and means for selectively fixing the brace at a definite angle relative to the frame.

10. A construction as defined in claim 4, wherein said manually operable means includes an elevating brace including side bars, guiding sections in which the side bars are slidable, a frame bar on which the guiding sections are rotatably supported, and stops fixed on the rails, said guiding sections being formed in part to engage said stops to selectively limit the angular operative relation of the elevating brace with the frame.

11. A construction as defined in claim 4, wherein the manually operable means includes an elevating brace slidably and swingingly mounted in the frame and means for operatively moving the brace at an angle to and into contact with the ground below the frame to selectively elevate the front end of the frame, said brace being swingingly movable into an inoperative position beneath the frame and between and above the lower margins of the rails.

VICTOR J. HULTQUIST.